US006429424B1

(12) United States Patent
Park

(10) Patent No.: US 6,429,424 B1
(45) Date of Patent: Aug. 6, 2002

(54) OPTICAL SCANNING SYSTEM OF PRINTER AND DRIVING METHOD THEREOF

(75) Inventor: Sang-shin Park, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 97 days.

(21) Appl. No.: 09/628,292

(22) Filed: Jul. 28, 2000

(30) Foreign Application Priority Data

Jul. 29, 1999 (KR) .............................. 99-31049

(51) Int. Cl.[7] ................................ H01J 3/14
(52) U.S. Cl. ...................... 250/236; 250/234; 347/250; 347/252; 347/261
(58) Field of Search ................. 250/234, 235, 250/236, 214 R, 205; 347/235, 248, 250, 252, 261; 359/196, 197, 216

(56) References Cited

U.S. PATENT DOCUMENTS 6,043,484 A * 3/2000 Park ........................... 250/234

6,211,987 B1 * 4/2001 Park ........................... 250/236

* cited by examiner

Primary Examiner—Kevin Pyo
(74) Attorney, Agent, or Firm—Sughrue Mion, PLLC

(57) ABSTRACT

An optical scanning system of a printer includes an optical scanning unit including a light source, a rotating polygonal mirror having a plurality of mirror surfaces for deflecting light emitted from the light source toward a photoreceptor web, and a driving source for driving the rotating polygonal mirror. The optical scanning system further includes a mirror, a photodetector installed to receive light scanned by the optical scanning unit to a position off the photoreceptor, and a controller for controlling a scanning start point of image data for lines by the optical scanning unit by obtaining information on addresses of mirror surfaces of the rotating polygonal mirror while counting the number of pulse signals output from the photodetector corresponding to the light received thereby, and by applying a line scanning synchronization correction time corresponding to the mirror surface address information with respect to a light receiving termination point of the pulse signal, to correct a line scanning synchronization time according to the difference in the amount of light reflected from each mirror surface of the rotating polygonal mirror.

6 Claims, 5 Drawing Sheets

OPTICAL SCANNING SYSTEM OF PRINTER AND DRIVING METHOD THEREOF

BACKGROUND OF THE INVENTION

1. Field of the Invention

The present invention relates to an optical scanning system of a printer and a driving method thereof and, more particularly, to an optical scanning system of a printer which can prevent a writing error of line image data on a photoreceptor web due to the difference in the amount of light reflected by each of the mirror surfaces of a polygonal rotating mirror, and a driving method thereof.

2. Description of the Related Art

FIG. 1 shows an optical scanning system of a conventional printer. Referring to the drawing, an optical scanning system includes an optical scanning unit 20 for scanning light onto a photoreceptor web 14 circulating by being supported by a plurality of rollers 11, 12 and 13, a photodetector 26, a line scanning start determination portion 31 and an optical scanning controller 32.

The optical scanning unit 20 includes a light source 21, a polygonal rotating mirror 22, a lens unit 23, and a driving source 24. The polygonal rotating mirror 22 is rotated at a predetermined speed by the driving source 24. The photodetector 26 is installed to detect light emitted from the optical scanning unit 20 and scanned from a position off the photoreceptor web 14 to the edge of the photoreceptor web 14.

The line scanning start determination portion 31 outputs a line scanning start signal after a predetermined wait time with respect to a light receiving termination point of a pulse signal output by the photodetector 26 corresponding to light reception. The wait time corresponds to the time needed to scan light in a non-image zone N from the edge of the photoreceptor web 14 to the image writing zone D. The optical scanning controller or controlling portion 32 drives the light source 21 so that light corresponding to line image data is emitted in synchronization with the line scanning start signal.

However, in the conventional optical scanning system, the respective mirror surfaces, such as mirror surfaces 22a and 22b, of the polygonal rotating mirror 22 reflect different amounts of light due to a manufacturing error. That is, FIG. 2 shows an example of the pulse signal output from the photodetector 26, when the respective mirror surfaces 22a and 22b of the polygonal rotating mirror 22 are assigned their own numbers and the amount of light reflected from the mirror surfaces 22a and 22b are different. The line scanning start determining portion 31 compares the pulse signal output from the photodetector 26 with a predetermined reference level signal and determines and processes an input signal over a reference level set to restrict a signal processing error due to noise, as a light receiving pulse signal. As a result, according to a line scanning synchronizing method for each mirror surface by the conventional optical scanning system, the line image data writing start position is different on the photoreceptor web 14, as much as the pulse width difference d between the light receiving termination positions of the pulse signals corresponding to the mirror surfaces 22a and 22b with respect to the set reference level. Thus, the writing start position of the image data for each line written on the photoreceptor web 14 is uneven along the circulating direction of the photoreceptor web 14, with a period of the number of lines which corresponds to the total number of the mirror surfaces of the polygonal rotating mirror 22.

SUMMARY OF THE INVENTION

To solve the above problem, it is an object of the present invention to provide an optical scanning system of a printer which can write image data for each line on a photoreceptor web with the writing start positions of each line perfectly aligned by correcting the difference in the amount of light reflected from each mirror surface of a polygonal rotating mirror, and a driving method thereof.

Accordingly, to achieve the above object, there is provided an optical scanning system of a printer, which comprises an optical scanning unit including a light source, a rotating polygonal mirror having a plurality of mirror surfaces for deflecting light emitted from the light source toward a photoreceptor web, and a driving source for driving the rotating polygonal, mirror. The optical scanning system further comprises a photodetector installed to receive light scanned by the optical scanning unit to a position off the photoreceptor, and a controller for controlling a scanning start point of image data for lines by the optical scanning unit by obtaining information on addresses of mirror surfaces of the rotating polygonal mirror while counting the number of pulse signals output from the photodetector corresponding to the light received thereby, and by applying a line scanning synchronization correction time corresponding to the mirror surface address information with respect to a light receiving termination point of the pulse signal, to correct a line scanning synchronization time according to the difference in the amount of light reflected from each mirror surface of the rotating polygonal mirror.

It is preferable in the present invention that the controller comprises a pulse counter for counting the number of pulse signals output from the photodetector and outputting a count value, a scanning synchronization correction time calculation portion for mirror surfaces for obtaining information on addresses of mirror surfaces of the rotating polygonal mirror from the count value output from the pulse counter, and calculating the correction time corresponding to the surface mirror address information from the amount of change in width of the pulse signal output from the photodetector, a line scanning start determination portion for outputting a line scanning start signal when it has received the correction time output from the scanning synchronization correction time calculation portion with respect to the light receiving termination point of the pulse signal output from the photodetector, and an optical scanning controlling portion for controlling the light source so that light corresponding to the line image data is emitted in synchronization with the line scanning start signal.

Also, it is preferable in the present invention that the scanning synchronization correction time calculation portion for each line calculates a correction time corresponding to the mirror surface address information and stores the calculated time when a correction time calculation instruction signal is received from the optical scanning controlling portion, and outputs the stored correction time to the line scanning start determination portion corresponding to the count value output from the pulse counter when a printing mode signal is received from the optical scanning controlling portion.

To achieve the above object, there is provided a method of driving an optical scanning system of a printer, the optical scanning system including an optical scanning unit having a light source, b) a rotating polygonal mirror having a plurality of mirror surfaces for deflecting light emitted from the light source toward a photoreceptor web, and c) a driving source for driving the rotating polygonal mirror, 2) a photodetector installed to receive light scanned by the optical scanning unit to a position off the photoreceptor, and 3) a controller which controls a line scanning start point of image data for lines by the optical scanning unit by receiving a pulse signal output corresponding to light received by the photodetector and which corrects the difference in the amount of light reflected from each mirror surface of the rotating polygonal mirror.The method is achieved by stopping the photoreceptor web, counting the number of pulse signals output from the photodetector while the optical scanning unit scans light, and calculating a scanning synchronization correction time for lines with respect to the difference in the amount of light reflected from each mirror surface, and storing the calculated is result by calculating the difference in width between the pulse signals with respect to addresses of the mirror surfaces of the rotating polygonal mirror corresponding to the count value, and when there is a request for printing while continuously counting the number of pulse signals output from the photodetector, rotating the photoreceptor web, and controlling the light source to emit light corresponding to line image data when it is the stored correct time corresponding to the count value of the pulse signal with respect to a light receiving termination point of the pulse signal.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Figure 1:
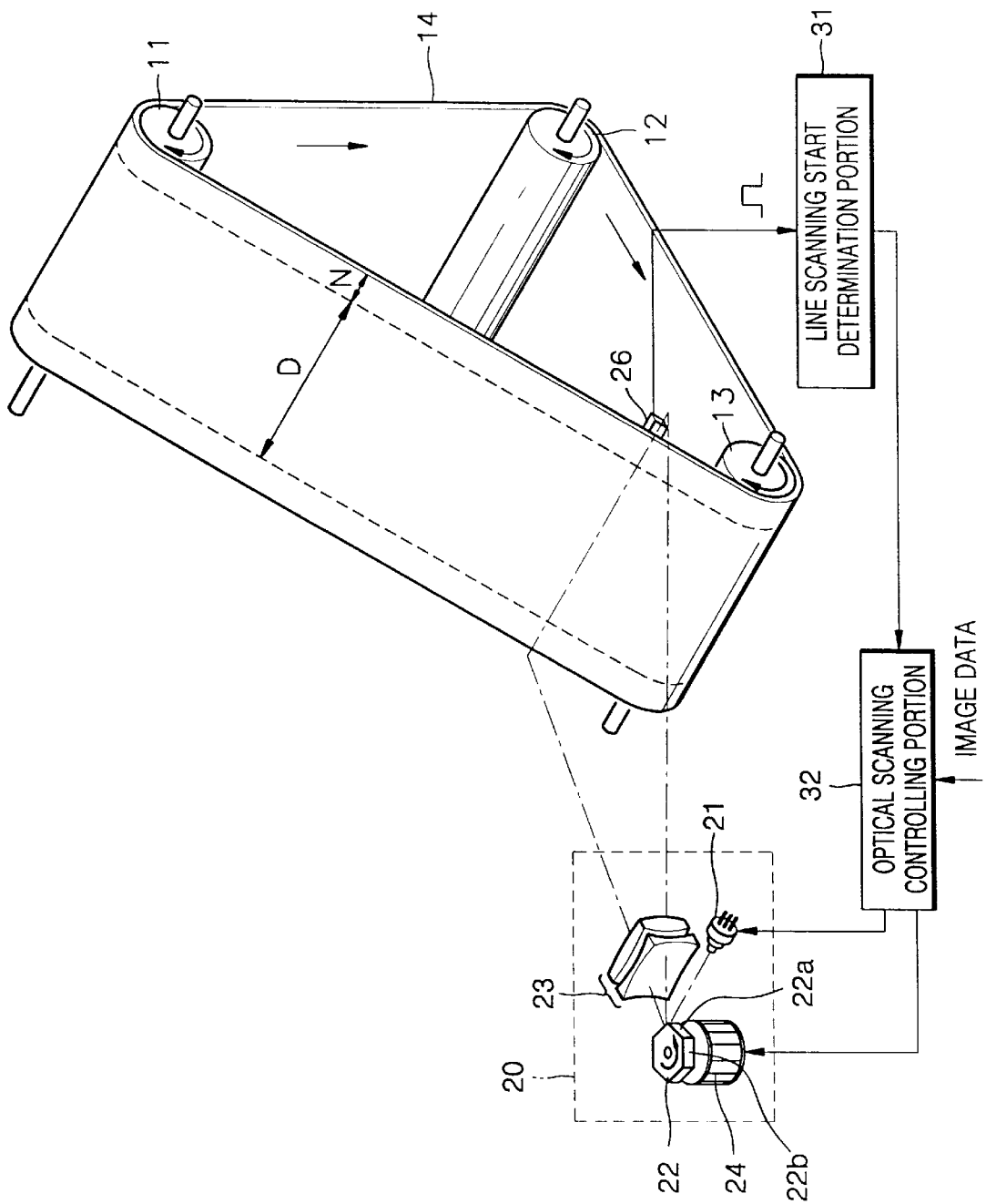
FIG. 1 is a view showing the conventional optical scanning system of a printer.
Figure 2:
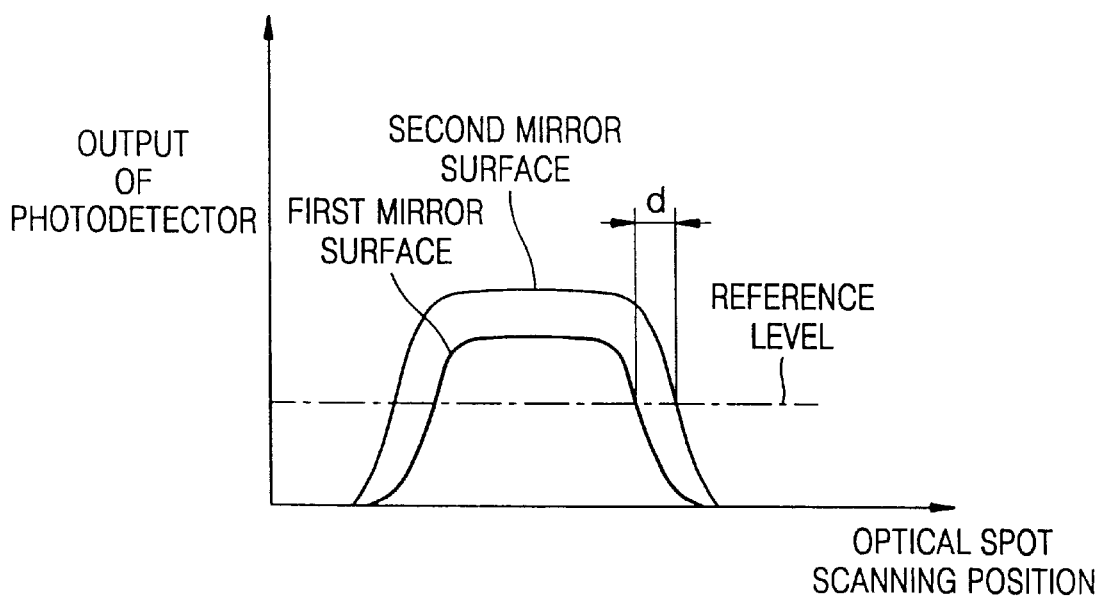
FIG. 2 is a graph showing an example of a change of an output pulse for two mirror surfaces of the photodetector generated due to the difference in the amount of light reflected from the two mirror surfaces of the polygonal rotating mirror of FIG. 1.
Figure 3:
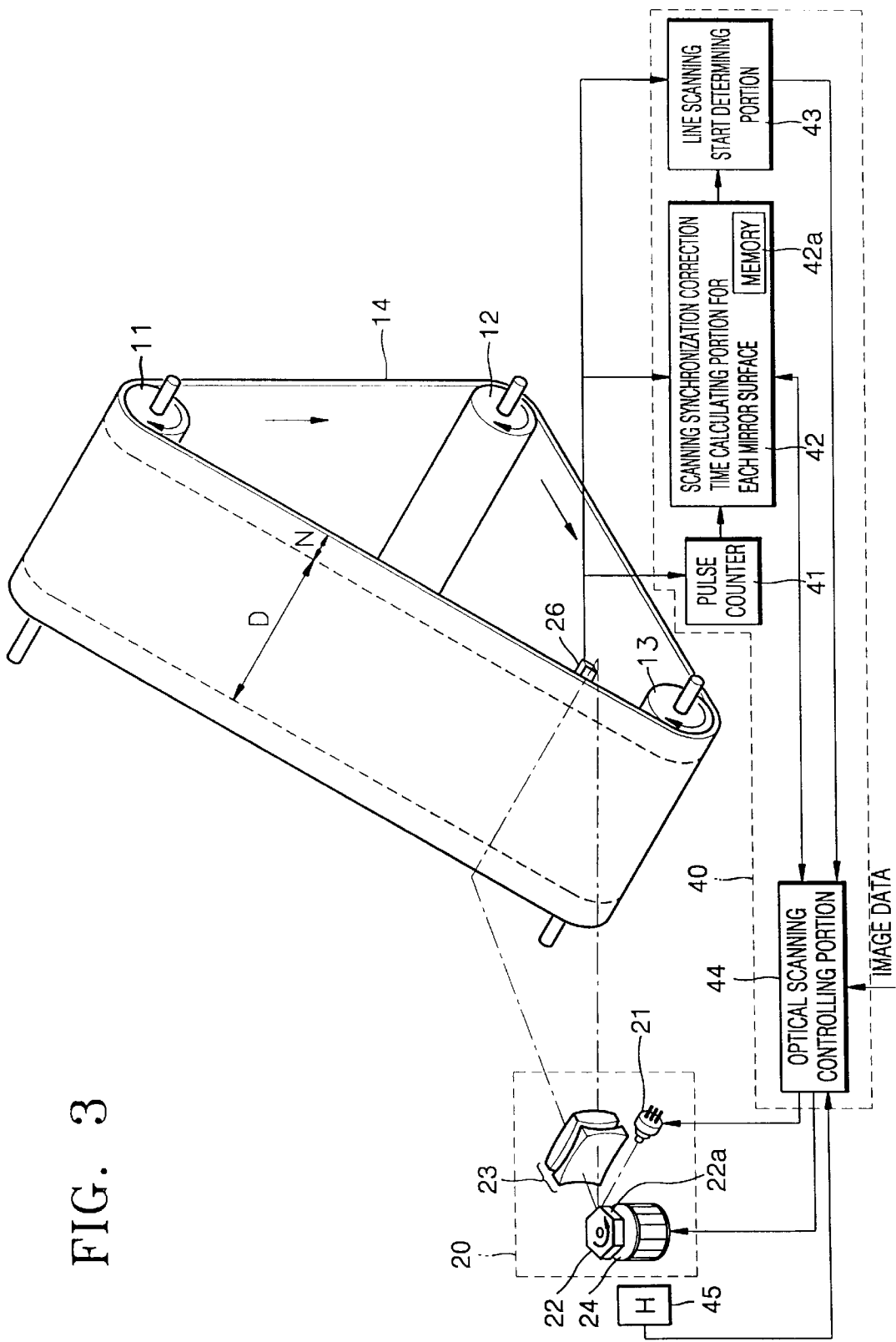
FIG. 3 is a view showing an optical scanning system of a printer according to the present invention.

Referring to FIG. 3, an optical scanning system of the present invention includes an optical scanning unit 20, a photodetector 26 and a controller 40. In the drawing, the same elements having the same functions as those described with reference to the previous drawings are indicated by the same reference numerals.

The optical scanning unit 20 includes the light source 21, the polygonal rotating mirror 22, the lens unit 23, and the driving source 24, so that light is scanned onto the photoreceptor web 14 circulating around the rollers 11, 12 and 13. A Hall sensor 45 obtains information on the rotation speed of the rotating polygonal mirror 22 having a plurality of mirror surfaces 22a from the driving source and provides the information to an optical scanning controlling portion 44.

The photodetector 26 is installed so as to detect light emitted from the optical scanning unit 20 and scanned from a position off the photoreceptor web 14 to the edge of the photoreceptor web 14. The controller 40 includes a pulse counter 41, a portion 42 for calculating scanning synchronization correction time for mirror surfaces, a line scanning start determining portion 43, and the optical scanning controlling portion 44.

The pulse counter 41 counts and outputs the number of pulse signals output from the photodetector 26. Preferably, the pulse counter 41 periodically counts the number corresponding to the number of the overall mirror surfaces of the rotating polygonal mirror 22 and outputs the count value. For example, when the number of the overall mirror surfaces of the rotating polygonal mirror 22 is 6, the pulse counter 41 repeatedly counts from 1 to the maximum number of 6.

When power is applied to the printer and the system is initialized, and when a correction time calculation instruction signal is received from the optical scanning controlling portion 44, the correction time calculating portion 42 assigns an address to the mirror surface 22a of the rotating polygonal mirror 22 from the count value output from the pulse counter 41, and calculates a correction time for line scanning synchronization corresponding to the assigned address of the mirror surface from the amount of change of the width of a pulse signal output from the photodetector 26, and stores the calculated amount in a memory 42a according to the assigned address of the mirror surface.

Figure 4:
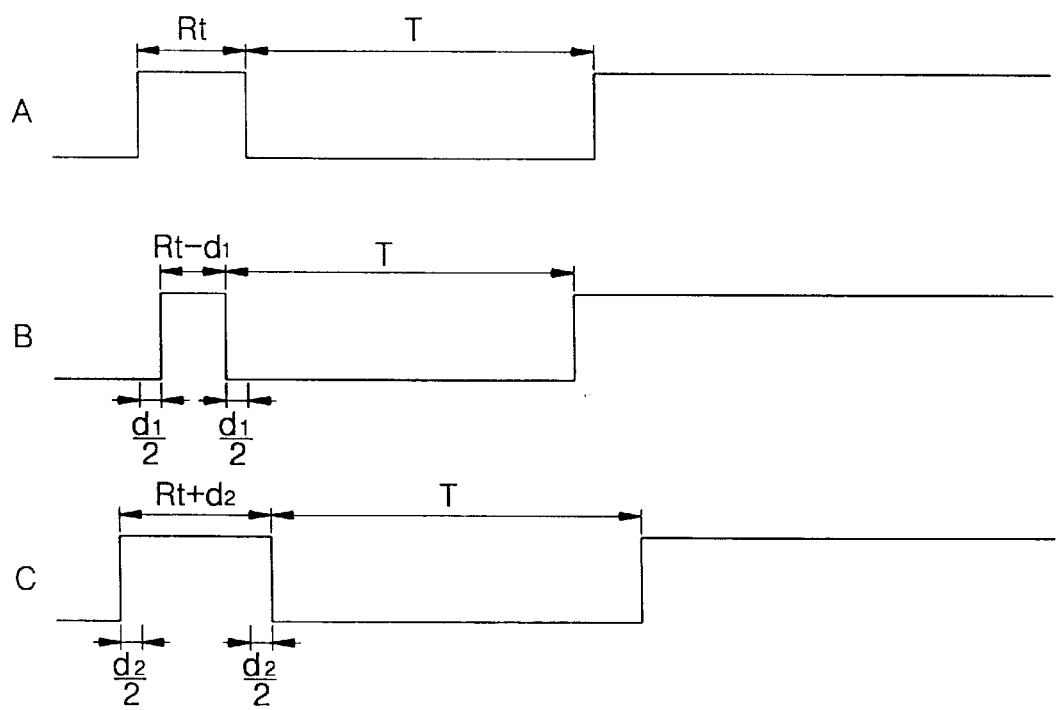
FIG. 4 is a graph showing a change in the width of the light receiving pulse signal due to the difference of the amount of light reflected by each mirror surface of the polygonal rotating mirror.

The method of calculating the correction time for mirror surfaces may be performed by various methods. For example, in a first calculation step, a correction value of the width of the light receiving pulse signal due to the difference in the amount of light reflected by each mirror surface 22a of the polygonal rotating mirror 22 is detected as follows. Referring to FIG. 4, in the state in which the polygonal rotating mirror 22 rotates at a set speed, it is assumed that the width of the light receiving pulse signal reflected by one mirror surface A which is a standard mirror surface of the polygonal rotating mirror 22, detected by the photodetector 26, and compared with a preset reference level signal is a reference time Rt. The width of the light receiving pulse signal from the signal detected from the light reflected by another mirror surface B due to the difference in the amount of light reflected by each mirror surface of the polygonal rotating mirror 22 can be Rt−d1 which is less than Rt. The width of the light receiving pulse signal from the signal detected from the light reflected by another mirror surface C can be Rt+d2 which is greater than Rt. Thus, by setting the reference time Rt corresponding to the light receiving reference pulse width and obtaining the difference between the set reference time Rt and the width of the input light receiving pulse signal for each mirror surface, the value is divided by 2 and the light receiving pulse signal width correcting value due to the difference in the amount of light reflected by each mirror surface is detected. In this case the light receiving pulse signal width correcting value is 0, or a value with a + or − sign. Then, in the second calculating step, a value obtained by subtracting the correcting value obtained from the first calculating step from a waiting time T set to correspond to the scanning distance (corresponding to the width of the non-image zone N) from the edge of the photoreceptor web 14 to the image writing zone D with respect to the light receiving termination point, is calculated as a correction time. By repeating the above steps for each mirror surface, the calculated correction time is stored in the memory 42a to correspond to the mirror surface address information. The reference time Rt corresponding to the reference pulse width may be set by averaging values of the widths of pulse signals corresponding to each mirror surface, or a mirror surface of an arbitrary address is set as the reference mirror surface, the width of a pulse signal corresponding to the reference mirror surface may be set as the reference time Rt. Here, the photoreceptor web 14 is preferably stopped during the above correction time calculating steps.

Also, when a printing mode signal is received from the optical scanning controlling portion 44 after the correction time calculation step is completed, the correction time calculating portion 42 outputs correction time data of a mirror surface address corresponding to the count value output from the pulse counter 41 to the line scanning start determining portion 43.

The line scanning start determining portion 43 receives the pulse signal and the correction time from the photodetector 26 and the correction time calculating portion 42, respectively. The line scanning start determining portion 43 outputs a line scanning start signal when it has received the correction time output from the correction time calculating portion 42, with respect to the light receiving termination point of the pulse signal output from the photodetector 26.

The optical scanning controlling portion 44 controls each element of the optical scanning system. When a line scanning start signal is input from the line scanning start determining portion 43, the optical scanning controlling portion 44 controls the light source 21 so that light corresponding to the line image data can be emitted.

Figure 5:
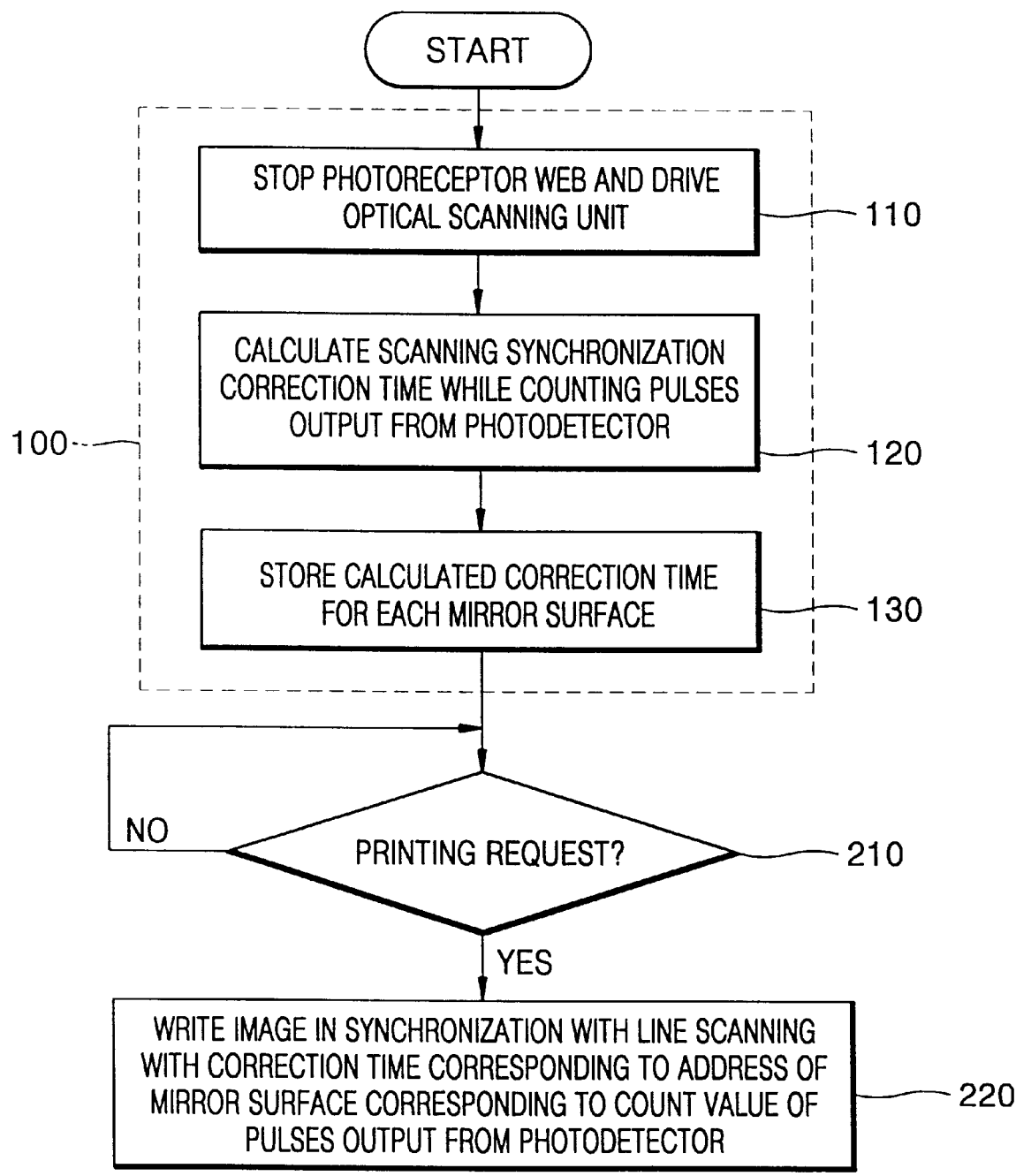
FIG. 5 is a flow chart for explaining a driving process of the optical scanning system according to the present invention.

FIG. 5. shows the process of the optical scanning system having the above structure according to the present invention. Referring to FIG. 5, first, when the power is input in the printer, an initialization process is performed (step 100). In the initialization process, the optical scanning controlling portion 44 controls the rotating polygonal mirror 22 to rotate at a set speed using information on speed output from the Hall sensor 45 in a state in which the photoreceptor web 14 is stopped (step 110). If the rotational speed of the rotating polygonal mirror 22 is determined to have reached the set speed, the optical scanning controlling portion 44 drives the light source 21 so that the optical scanning unit 20 emits light and outputs a correction time calculation instruction signal to the correction time calculating portion 42. The correction time calculating portion 42 receiving the correction time calculation instruction signal, assigns the count value output from the pulse counter 41 corresponding to the mirror surface facing a light of the light source 21 as an address, and calculates the correction time from the width of the pulse signal output from the photodetector 26 in the above-described method (step 120). The calculated correction time for each address of the mirror surfaces is stored in the memory 42*a* (step 130). The optical scanning controlling portion 44 receives a calculation termination signal from the correction time calculating portion 42 and determines whether the initialization process is completed.

When the optical scanning controlling portion 44 determines that the initialization process is completed, the optical scanning controlling portion 44 maintains a printing mode so that a printing job can be performed. Here, the optical scanning controlling portion 44 outputs a printing mode signal to the scanning time calculating portion 42. The correction time calculating portion 42 receiving the printing mode signal searches for the correction time stored in the memory 42*a* corresponding to the count value output from the pulse counter 41 and outputs the correction time to the line scanning start determining portion 43.

Then, the optical scanning controlling portion 44 determines whether there is a request for printing (step 210). If there is a request for printing, the optical scanning controlling portion 44 performs a printing process (step 220). That is, while controlling the photoreceptor web 14 to circulate at the set speed, the optical scanning controlling portion 44 drives the light source 21 in synchronization with the line scanning start signal output from the line scanning start determining portion 43 so that light corresponding to the line image data can be emitted.

The rotating polygonal mirror 22, the photodetector 26 and the pulse counter 41 are continuously driven during the printing mode, so that the address of a mirror surface assigned in the initialization process (step 100) is not changed.

As described above, according to the optical scanning system and the driving method thereof according to the present invention, by adjusting the scanning start time of the line image data corresponding to the difference in the amount of light reflected from the different mirror surfaces of the rotating polygonal mirror, an image writing error can be prevented.

What is claimed is:

1. An optical scanning system of a printer, comprising:

an optical scanning unit including a light source, a rotating polygonal mirror having a plurality of mirror surfaces for deflecting light emitted from the light source toward a photoreceptor web, and a driving source for driving the rotating polygonal mirror;

a photodetector installed to receive light scanned by the optical scanning unit to a position off the photoreceptor web and to output pulse signals; and a controller which controls a scanning start point of image data for lines by the optical scanning unit by obtaining information on addresses of the mirror surfaces of the rotating polygonal mirror while counting the number of the pulse signals output from the photodetector corresponding to the light received thereby, and which applies a line scanning synchronization correction time corresponding to the mirror surface address information with respect to a light receiving termination point of a corresponding one of the pulse signals output from the photodetector with respect to a corresponding one of the mirror surfaces, to correct a line scanning synchronization time according to the difference in the amount of light reflected from each mirror surface of the rotating polygonal mirror.

2. The system as claimed in claim 1, wherein the controller comprises:

a pulse counter for counting the number of pulse signals output from the photodetector and outputting a count value;

a scanning synchronization correction time calculation portion for mirror surfaces for obtaining information on addresses of mirror surfaces of the rotating polygonal mirror from the count value output from the pulse counter, and calculating the correction time corresponding to the surface mirror address information from the amount of change in width of the corresponding pulse signal output from the photodetector;

a line scanning start determination portion for outputting a line scanning start signal when it has received the correction time output from the scanning synchronization correction time calculation portion with respect to the light receiving termination point of the corresponding pulse signal output from the photodetector; and an optical scanning controlling portion for controlling the light source so that light corresponding to the line image data is emitted in synchronization with the line scanning start signal.

3. The system as claimed in claim 2, wherein the scanning synchronization correction time calculation portion for each line calculates a correction time corresponding to the mirror surface address information and stores the calculated time when a correction time calculation instruction signal is received from the optical scanning controlling portion, and outputs the stored correction time to the line scanning start determination portion corresponding to the count value output from the pulse counter when a printing mode signal is received from the optical scanning controlling portion.

4. The system as claimed in claim 2, wherein the pulse counter periodically counts the number corresponding to the total number of mirror surfaces of the rotating polygonal mirror and outputs the counted number.

5. A method of driving an optical scanning system of a printer, the optical scanning system including 1) an optical scanning unit including a) a light source, b) a rotating polygonal mirror having a plurality of mirror surfaces for deflecting light emitted from the light source toward a photoreceptor web, and c) a driving source for driving the rotating polygonal mirror, 2) a photodetector installed to receive light scanned by the optical scanning unit to a position off the photoreceptor web, and 3) a controller which controls a line scanning start point of image data for lines by the optical scanning unit by receiving a pulse signal output corresponding to light received by the photodetector and which corrects the difference in the amount of light reflected from each mirror surface of the rotating polygonal mirror, the method comprising:

stopping the photoreceptor web, counting the number of pulse signals output from the photodetector while the optical scanning unit scans light, and calculating a scanning synchronization correction time for lines with respect to the difference in the amount of light reflected from each mirror surface, and storing the calculated result by calculating the difference in width between the pulse signals with respect to addresses of the mirror surfaces of the rotating polygonal mirror corresponding to the count value; and when there is a request for printing while continuously counting the number of pulse signals output from the photodetector, rotating the photoreceptor web, and controlling the light source to emit light corresponding to line image data when it is the stored correct time corresponding to the count value of the pulse signal with respect to a light receiving termination point of the pulse signal output from the photodector with respect to a corresponding one of the mirror surfaces.

6. The method as claimed in claim 5, wherein the pulse counter periodically counts the number corresponding to the total number of mirror surfaces of the rotating polygonal mirror and outputs the counted number.

* * * * *